United States Patent [19]
Torii et al.

[11] Patent Number: 4,540,500
[45] Date of Patent: Sep. 10, 1985

[54] LOW TEMPERATURE SINTERABLE OXIDE MAGNETIC MATERIAL

[75] Inventors: Michihiro Torii; Tomoyoshi Kosaka, both of Shizuoka; Takeo Maeda, Aichi; Hiroshi Rikukawa, Shizuoka, all of Japan

[73] Assignee: Fuji Electrochemical Co., Ltd., Tokyo, Japan

[21] Appl. No.: 557,136

[22] PCT Filed: Feb. 23, 1983

[86] PCT No.: PCT/JP83/00055
  § 371 Date: Oct. 20, 1983
  § 102(e) Date: Oct. 23, 1983

[87] PCT Pub. No.: WO83/03094
  PCT Pub. Date: Sep. 15, 1983

[30] Foreign Application Priority Data
  Mar. 2, 1982 [JP] Japan .................. 57-32646

[51] Int. Cl.$^3$ .................. C04B 35/26; C04B 35/64
[52] U.S. Cl. .................. 252/62.58; 252/62.59; 252/62.6; 252/62.61; 252/62.62; 252/62.64

[58] Field of Search ............... 252/62.58, 62.59, 62.6, 252/62.61, 62.62, 62.64

[56] References Cited

U.S. PATENT DOCUMENTS 2,980,617 4/1961 Ireland ..................... 252/62.58
3,188,400 6/1965 Vilensky ................... 252/62.61 X

OTHER PUBLICATIONS

Paria et al. "J. of Materials Science", 17, No. 5, May, 1982, pp. 1459–1464.

Primary Examiner—Jack Cooper
Attorney, Agent, or Firm—Fleit, Jacobson, Cohn & Price

[57] ABSTRACT

A low temperature sinterable oxide magnetic material prepared by adding 0.1 to 5% by weight of glass containing 3 to 50 mol % of $Li_2O$, 10 to 97 mol % of $B_2O_3$ and 0 to 70 mol % of $SiO_2$ to ferrite containing at least 0.5 mol % of $Li_2O$. Especially, when a glass containing 10–28 mol % of $Li_2O$, 34 to 66 mol % of $B_2O_3$, and 15 to 45 mol % of $SiO_2$ is used, the sintering temperature can be reduced to about 1,000° C. or less.

5 Claims, 3 Drawing Figures

FIG. 2
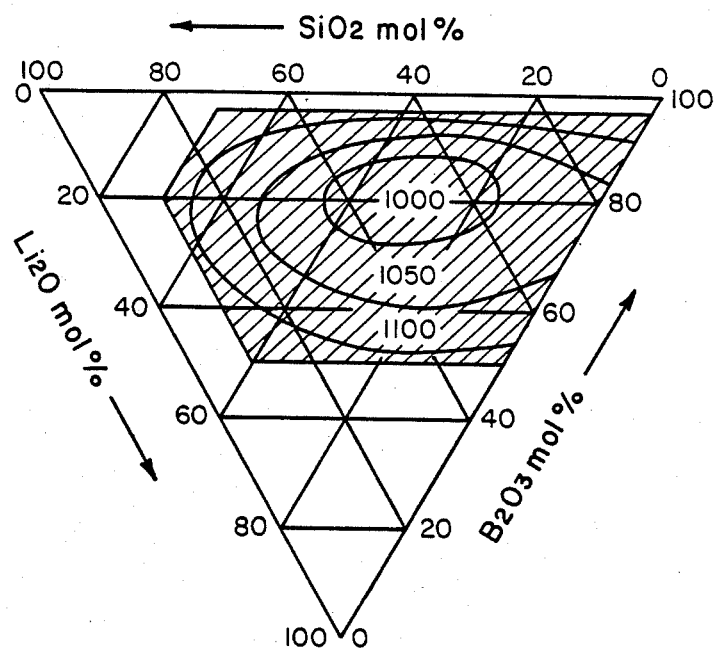
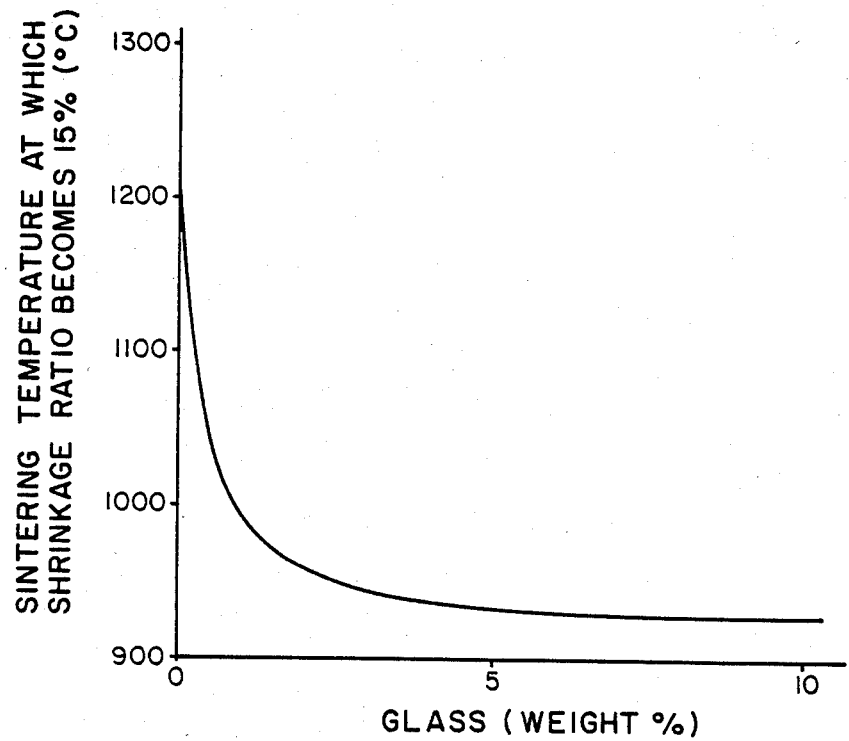
FIG. 3

LOW TEMPERATURE SINTERABLE OXIDE MAGNETIC MATERIAL

TECHNICAL FIELD

This invention relates to a ferrite that can be sintered at a low temperature by liquid phase sintering utilizing glass.

BACKGROUND ART

As is well known, the term "ferrite" is a generic term for groups of inorganic compounds containing $Fe_2O_3$ as one of their components, most of them are ferromagnetic and are widely used in practical applications as magnetic materials. $Fe_2O_3$ forms various compounds depending upon the properties of the other components of the material, and their combinations in turn form a huge number of composite ferrites and a wide variety of substitutional solid solutions and addition solid solutions.

A sintering step is employed in order to obtain a sintered body having the desired magnetic characteristics and mechanical strength by heating an article molded of powdered raw materials to a high temperature in an appropriate atmosphere, and increasing the density greatly while a solid phase chemical reaction is being carried out between the raw materials. This sintering temperature varies according to the composition of the raw materials, the shape of the powdered raw materials, the sintering method, etc. In general, the sintering temperature is between 1,200° to 1,400° C. for manganese ferrites and magnesium ferrites, 1,050° to 1,200° C. for nickel ferrites, 950° to 1,100° C. for copper ferrites, 1,050° to 1,150° C. for lithium ferrites, and 1,100° to 1,250° C. for barium ferrites and strontium ferrites. If sintering could be done at a temperature lower than these ranges, great practical advantages could be obtained not only because of the large savings of energy and improvements in productivity that can be accomplished, but also because the ferrites can be sintered simultaneously with other articles and materials (such as metal electrodes that decompose thermally at high temperatures), thereby making it possible to develop novel electronic components.

A pressure-sintering method or the like can be used for low temperature sintering. However, since this method requires special apparatus and has a low productivity, the shape and application of the products are very limited. As well as such a specific method, the following methods can be employed:

(1) A reduction of particle diameter.
(2) Making the particle shape as spherical as possible.
(3) The introduction of oxygen into the space lattice. (This is based upon the knowledge that the diffusion of oxygen ions is a rate-determining factor in the sintering of ferrites.)
(4) The use of liquid phase sintering.

In the production of a ferrite, the raw materials go through the steps of mixing, calcining and milling and are thereby adjusted to be a powder of substantially spherical particles with a particle diameter of up to 1 μm. If the particle size is reduced further, the moldability would drop impracticably. Accordingly, there is not much scope for change in methods (1) and (2) above. In method (3), a composition containing an amount of $Fe_2O_3$ that is smaller than the stoichiometric amount is selected, and this has been used in the past. The above sintering temperature includes the effects of this method. The use of the liquid phase sintering of method (4) usually provides a low temperature sintering effect, but no technique has yet been found that provides a large effect for ferrites. The prior art techniques that provide such low temperature sintering effects deteriorate the magnetic characteristics markedly, especially the loss coefficient. In addition, the low melting-additives used to induce the liquid phase are usually expensive.

DISCLOSURE OF INVENTION

It is therefore an object of the present invention to provide an oxide magnetic material which eliminates the problems with the prior art techniques, which can be sintered at a low temperature using ordinary apparatus, which causes hardly any deterioration of the magnetic characteristics, and which is still economical.

Accordingly, the present invention uses an $Li_2O$—$B_2O_3$—$SiO_2$ glass as the additive inducing the liquid phase, and also incorporates $Li_2O$ in the mother ferrite material so as to improve the mutual wettability of the ferrite and the glass, and to make it possible to carry out sintering at a low temperature.

Namely, the present invention relates to an oxide magnetic material prepared by adding 0.1 to 5% by weight of glass containing 3 to 50 mol % of $Li_2O$, 10 to 97 mol % of $B_2O_3$ and 0 to 70 mol % of $SiO_2$ to a ferrite containing at least 0.5 mol % of $Li_2O$. The reason for this composition and the effects produced by such a composition will become apparent from the following description.

BRIEF DESCRIPTION OF THE DRAWING

FIG. 2 is a graph showing the glass composition at which the shrinkage ratio of the mixture becomes 15% when the glass is added to Mg-ferrite; and FIG. 3 is a graph showing the relationship between the quantity of glass added and the sintering temperature.

BEST MODE FOR CARRYING OUT THE INVENTION

Figure 1:
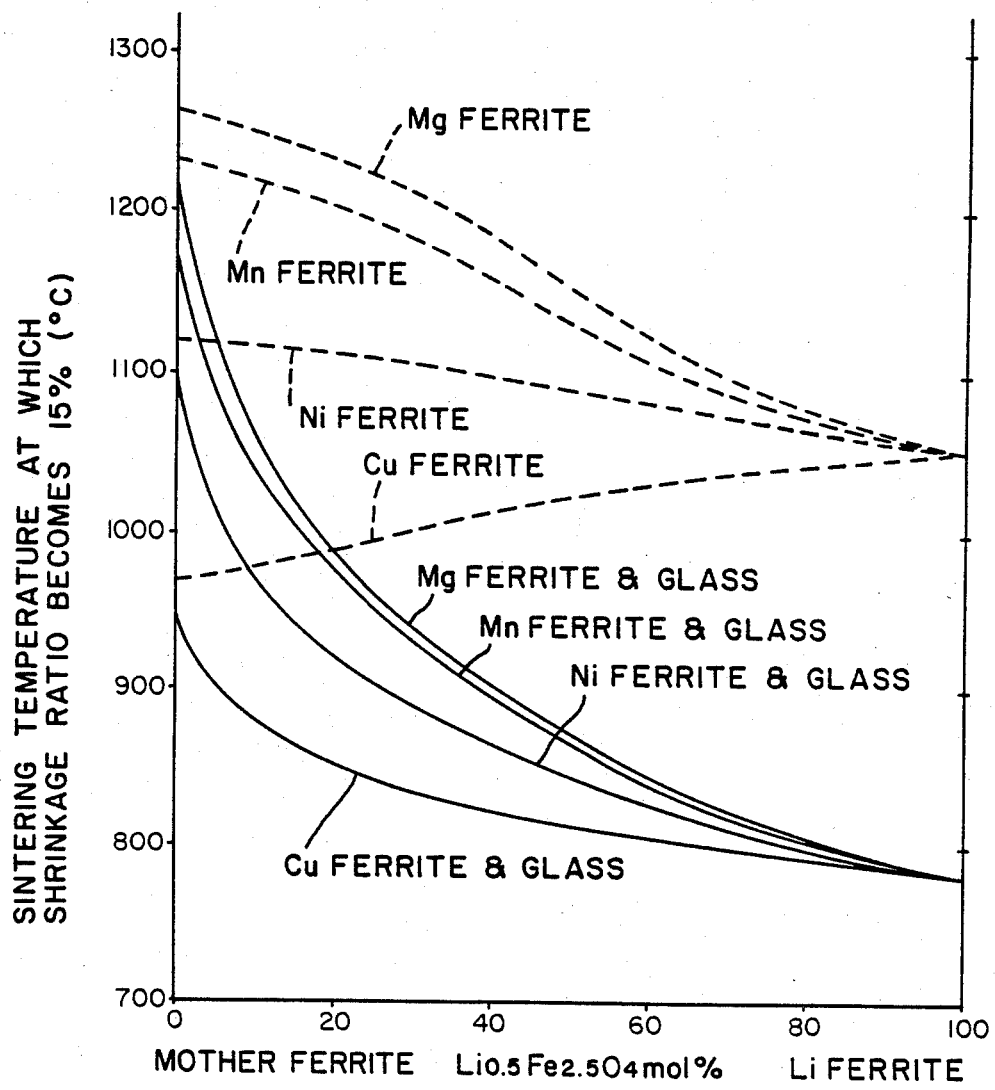
FIG. 1 is a graph showing the relationship between the ferrite composition and the sintering temperature.

FIG. 1 shows the curves of sintering temperatures at which the shrinkage ratio becomes 15% when those samples which are obtained by substituting Mn ferrite, Ni ferrite, Mg ferrite, and Cu ferrite by Li ferrite, and those which are obtained by adding 1% by weight of powdered glass consisting of 20 mol % of $Li_2O$, 40 mol % of $B_2O_3$ and 40 mol % of $SiO_2$ to each of the substituted samples, after the relative density of the samples becomes 54–55% relative to the theoretical density. In the graph, the dashed lines represent the samples to which glass is not added and the solid lines represent the samples to which glass is added. It can be seen from the graph that the low temperature sintering effect is obtained to a certain extent just by the substitution by Li ferrite or by the addition of the glass alone, with the exception of Cu ferrite, but when both methods are combined, a greater effect can be obtained. It is believed that this effect is brought about because the lithium contained in both the mother ferrite and the glass liquid phase improve the wettability in the interface of this solid solution and the dissolving of the solid phase into the liquid phase, as well as the precipitation from the liquid phase, are promoted in the final stage of the liquid phase sintering.

The $Li_2O$ content in the mother ferrite is stipulated to be at least 0.5 mol % because at least 2 mol % of each of the Mg, Mn, Ni and Cu ferrites must be substituted by lithium ferrite in order to cause a drop in the sintering temperature of at least 50° C. by the addition of glass, when compared with the sintering temperature of the ferrites alone to which glass is not added. This corresponds to at least 0.5 mol % of Li in the composition of the raw materials. Incidentally, as can be seen from FIG. 1, a drop in the sintering temperature of at least 100° C. occurs under this condition in the Mg or Mn ferrites.

Generally, these ferrites are used after being partly substituted by zinc ferrite, and the low temperature sintering effect can be obtained by this substitution in the same way as in the case when there is no substitution.

FIG. 2 also shows the sintering temperatures at which the shrinkage ratio becomes 15% when the $Li_2O$—$B_2O_3$—$SiO_2$ ternary composition of the glass being added is changed in various ways, and 1% by weight of each of the resulting compositions is added to magnesium ferrite that has been substituted by 20 mol % lithium ferrite. The sintering temperature is 1,260° C. for plain magnesium ferrite (when glass is not added). In order to reduce the sintering temperature by at least 100° C. from this sintering temperature, it can be understood that the glass being added must have a composition consisting of 3 to 50 mol % of $Li_2O$, 10 to 97 mol % of $B_2O_3$ and up to 70 mol % of $SiO_2$ (within the region shaded with oblique lines in FIG. 2). As can also be seen from this graph, $SiO_2$ need not necessarily be included. The same low temperature sintering effect is brought about even if a different glass constituent(s) is mixed in as well as these components, so long as the principal components satisfy the conditions described above.

Especially, when a glass containing 10 to 28 mol % of $Li_2O$, 34 to 66 mol % of $B_2O_3$ and 15 to 45 mol % of $SiO_2$ is used, the sintering temperature can be reduced to about 1,000°0 C. or less, thereby making it possible to obtain a marked low temperature sintering effect.

FIG. 3 shows the sintering temperatures at which the shrinkage ratio becomes 15% when glass consisting of 20 mol % of $LiO_2$, 40 mol % of $B_2O_3$ and 40 mol % of $SiO_2$ is added to magnesium ferrite substituted by 20 mol % of lithium ferrite, and the quantity of glass added is varied. The effect of the addition of the glass is very large, when only 0.1% by weight of glass is added, the sintering temperature can be reduced by as much as 100° C. below the sintering temperature 1,260° C. of magnesium ferrite alone. The drop in the sintering temperature is barely observed when the quantity of glass added exceeds 5% by weight, but the magnetic characteristics deteriorate. Accordingly, the addition of more than 5% by weight of glass is not preferred. This is the reason why the quantity of glass to be added is stipulated to be between 0.1 to 5% by weight.

Examples of the present invention will be described below in comparison with prior art examples. The method of production is the heretofore known powder molding and sintering method.

EXAMPLE 1

Various quantities of glass consisting of 20 mol % of $Li_2O$, 40 mol % of $B_2O_3$ and 40 mol % of $SiO_2$ was added to a lithium ferrite consisting of 20 mol % of $Li_2O$, 10 mol % of ZnO and 70 mol % of $Fe_2O_3$, and the mixtures were sintered. The sintering temperature, the shrinkage ratio and the magnetic characteristics were as given in Table 1.

TABLE 1

| Quantity of glass added (wt %) | Sintering temperature (°C.) | Shrinkage ratio (%) | $\mu i$ | tan $\delta/\mu i$ (10 MHz) |
|---|---|---|---|---|
| 0 | 1025 | 14.5 | 45 | $11 \times 10^{-5}$ |
| 0.2 | 800 | 13.2 | 37 | $12 \times 10^{-5}$ |
| 0.5 | 800 | 14.5 | 44 | $12 \times 10^{-5}$ |
| 1 | 800 | 15.4 | 51 | $9.3 \times 10^{-5}$ |
| 3 | 800 | 15.6 | 42 | $11 \times 10^{-5}$ |
| 5 | 800 | 15.6 | 40 | $13 \times 10^{-5}$ |

As can be seen from Table 1, it is obvious that a lowering of the sintering temperature by as much as at least 200° C. becomes possible by the addition of glass. Even when such low temperature sintering is carried out, the overall magnetic characteristics exhibit hardly any significant changes, though some changes are observed in the initial permeability ($\mu i$) and the loss coefficient (tan$\delta/\mu i$). In view of the fact that when liquid phase sintering is effected, the particle size generally becomes larger and a drop in the loss coefficient occurs, the present invention is characterized in that such disadvantages do not occur in any way.

EXAMPLE 2

Various quantities of glass consisting of 19.6 mol % of $Li_2O$, 39.2 mol % of $B_2O_3$, 39.2 mol % of $SiO_2$ and 2.0 mol % of $V_2O_5$ was added to a ferrite consisting of 2.6 mol % of $Li_2O$, 19.0 mol % of MgO, 3.2 mol % of MnO, 22.1 mol % of ZnO and 53.1 mol % of $Fe_2O_3$, and the mixtures were sintered. The sintering temperature, the shrinkage ratio and the magnetic characteristics were as given in Table 2.

TABLE 2

| Quantity of glass added (wt %) | Sintering temperature (°C.) | Shrinkage ratio (%) | $\mu i$ | tan $\delta/\mu i$ (100 KHz) |
|---|---|---|---|---|
| 0 | 1230 | 15.0 | 300 | $5.3 \times 10^{-5}$ |
| 0.1 | 1130 | 15.1 | 320 | $6.0 \times 10^{-5}$ |
| 0.2 | 1100 | 14.9 | 310 | $5.5 \times 10^{-5}$ |
| 0.5 | 1050 | 15.0 | 320 | $5.7 \times 10^{-5}$ |
| 1 | 1000 | 15.2 | 300 | $5.0 \times 10^{-5}$ |
| 2 | 970 | 15.2 | 290 | $4.8 \times 10^{-5}$ |

In this example, the sintering temperatures were selected so that each sample exhibited substatially the same shrinkage ratio. It can be seen from Table 2 that in this example, too, the magnetic characteristics hardly change when compared with those of the ferrite to which glass was not added.

EXAMPLE 3

Various quantities of glass consisting of 10 mol % of $Li_2O$ and 90 mol % of $B_2O_3$ was added to a ferrite consisting of 5 mol % of $Li_2O$, 8 mol % of NiO, 5 mol % of CuO, 33 mol % of ZnO and 49 mol % of $Fe_2O_3$, the characteristics were as given in Table 3.

TABLE 3

| Quantity of glass added (wt %) | Sintering temperature (°C.) | Shrinkage ratio (%) | $\mu i$ | tan $\delta/\mu i$ (100 KHz) |
|---|---|---|---|---|
| 0 | 1070 | 14.5 | 1200 | $2.1 \times 10^{-5}$ |

TABLE 3-continued

| Quantity of glass added (wt %) | Sintering temperature (°C.) | Shrinkage ratio (%) | $\mu i$ | tan $\delta/\mu i$ (100 KHz) |
|---|---|---|---|---|
| 1 | 950 | 14.8 | 1150 | $2.0 \times 10^{-5}$ |

It can be seen that in this example, too, the same effects as those of Examples 1 and 2 can be obtained in the same way.

EXAMPLE 4

The present invention can be applied also to hard ferrites. Various quantities of glass constituting of 20 mol % of $Li_2O$, 15 mol % of $B_2O_3$ and 65 mol % of $SiO_2$ was added to a ferrite constituting of 1 mol % of $Li_2O$, 15 mol % of BaO and 84 mol % of $Fe_2O_3$, the characteristics were as given in Table 4.

TABLE 4

| Quantity of glass added (wt %) | Sintering Temp. (°C.) | Shrinkage ratio (%) | Br (Gauss) | BHC (Oe) | iHc (Oe) | (BH) max (M · G · Oe) |
|---|---|---|---|---|---|---|
| 0 | 1150 | 15.0 | 2200 | 1900 | 3300 | 1.0 |
| 1 | 1010 | 15.1 | 2200 | 1900 | 3200 | 1.0 |

It can be seen from Table 4 that the same effects as those of the previous examples are obtained in the same way. Though the example shown in Table 4 is related to the isotropic hard ferrites, similar effects could be obtained with respect to anisotropic hard ferrites.

As described above, the present invention has both the mother ferrite and the glass to be added contain lithium so that their mutual wettability can be improved, and a dramatic lowering of the sintering temperature can be accomplished with little deterioration of the magnetic characteristics. Hence the present invention makes a large contribution to the saving of energy as well as an improvement in productivity. Since sintering at a low temperature is now feasible, a magnetic material can be sintered simultaneously with those materials which would be thermally decomposed at high temperatures (e.g., electrode materials, etc.), and the development of novel small electronic components is possible. Since the cost of the glass added is much lower than that of the various low-melting-point oxides that have been utilized for liquid phase sintering in the past, the present invention is extremely effective in reducing the cost of materials.

We claim:

1. A method for reducing the sintering temperature of a magnetic ferrite material containing at least 0.5 mol % of $Li_2O$ which consists essentially of adding 0.1 to 5% by weight of a glass consisting essentially of 3 to 50 mol % of $Li_2O$, 10 to 97 mol % of $B_2O_3$ and 0 to 70 mol % of $SiO_2$ to said magnetic ferrite material prior to sintering, said glass effecting a magnetic ferrite material having a lower sintering temperature than said magnetic ferrite material absent said glass.

2. A method according to claim 1, wherein said glass contains 10 to 28 mol % of $Li_2O$, 34 to 66 mol % of $B_2O_3$, and 15 to 45 mol % of $SiO_2$.

3. A method according to claim 1, wherein said ferrite contains 20 mol % of $Li_2O$, 10 mol % of ZnO, and 70 mol % of $Fe_2O_3$.

4. A method according to claim 1, wherein said ferrite contains 2.6 mol % of $Li_2O$, 19.0 mol % of MgO, 3.2 mol % of MnO, and 22.1 mol % of ZnO.

5. A method according to claim 1, wherein said ferrite contains 5 mol % of $Li_2O$, 8 mol % of NiO, 5 mol % of CuO, 33 mol % of ZnO, and 49 mol % of $Fe_2O_3$.

* * * * *